US010531309B1

(12) United States Patent
Li et al.

(10) Patent No.: US 10,531,309 B1
(45) Date of Patent: Jan. 7, 2020

(54) SYSTEMS AND METHODS FOR OPTIMIZING WIRELESS NETWORK COVERAGE, CAPACITY, AND THROUGHPUT

(71) Applicant: Verizon Patent and Licensing Inc., Arlington, VA (US)

(72) Inventors: Yuk Lun Li, Morganville, NJ (US); Yuexin Dong, Bridgewater, NJ (US); Indraneel Sen, Livingston, NJ (US); Kyriaki Konstantinou, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/286,977

(22) Filed: Feb. 27, 2019

(51) Int. Cl.
*H04W 24/10* (2009.01)
*H04W 16/18* (2009.01)

(52) U.S. Cl.
CPC .......... *H04W 16/18* (2013.01); *H04W 24/10* (2013.01)

(58) Field of Classification Search
CPC ............................ H04W 16/18; H04W 24/10
See application file for complete search history.

(56) References Cited

U.S. PATENT DOCUMENTS

| 2016/0165472 A1* | 6/2016 | Gopalakrishnan .... | H04W 24/10 455/67.11 |
| 2016/0255509 A1* | 9/2016 | Imran ................... | H04W 4/029 455/414.2 |
| 2016/0277946 A1* | 9/2016 | Sofuoglu .............. | H04W 24/02 |

* cited by examiner

*Primary Examiner* — Chuong A Ngo

(57) ABSTRACT

A wireless network optimizing node receives key performance indicators (KPIs) from a base station of a cell site providing wireless service within a geographic area, wherein the KPIs are associated with wireless communication between beams of an antenna array of the cell site and User Equipment. The node determines a current cell site capacity usage for the cell site based on current wireless network usage parameters received from the cell site and determines a need for an additional antenna array to provide adequate coverage and capacity for the geographic area based on the current cell site capacity usage and the first KPIs. The node determines an optimum location within the geographic area for adding the additional antenna array.

20 Claims, 13 Drawing Sheets

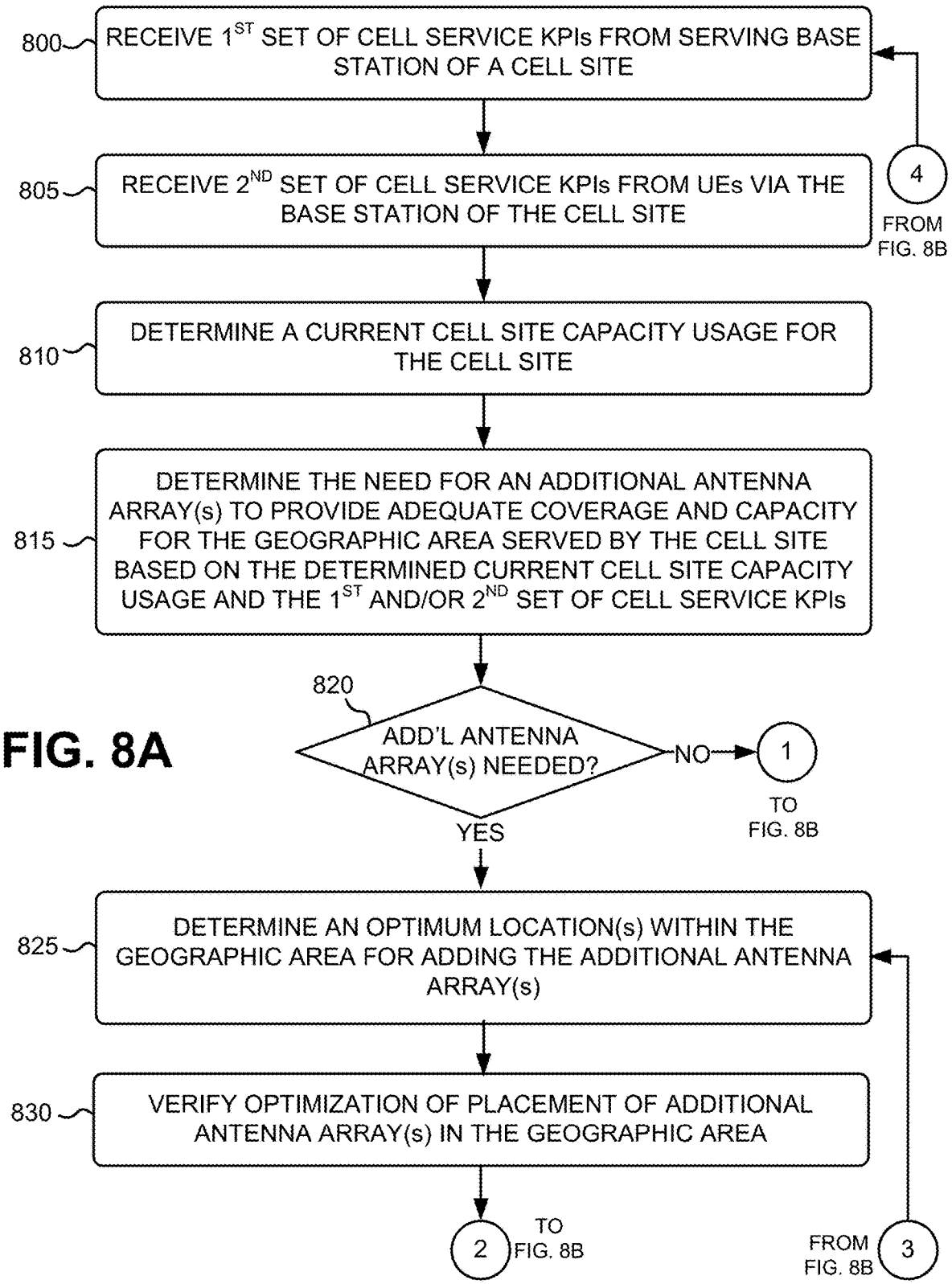

SYSTEMS AND METHODS FOR OPTIMIZING WIRELESS NETWORK COVERAGE, CAPACITY, AND THROUGHPUT

BACKGROUND

Next Generation mobile networks, such as Fifth Generation (5G) mobile networks, are expected to operate in the higher frequency ranges, and such networks are expected to transmit and receive in the GigaHertz band with a broad bandwidth near 500-1,000 MegaHertz. The expected bandwidth of Next Generation mobile networks is intended to support download speeds of up to about 35-50 Gigabits per second. The proposed 5G mobile telecommunications standard, among other features, operates in the millimeter wave bands (e.g., 14 GigaHertz (GHz) or higher), and supports more reliable, massive machine communications (e.g., machine-to-machine (M2M), Internet of Things (IoT), etc.). Next Generation mobile networks, such as those implementing the 5G mobile telecommunications standard, are expected to enable a higher utilization capacity than current wireless systems, permitting a greater density of wireless users, with a lower latency. Next Generation mobile networks, thus, are designed to increase data transfer rates, increase spectral efficiency, improve coverage, improve capacity, and reduce latency.

Millimeter wave (mmWave) frequencies are proposed to be used in advanced wireless systems, such as, for example, 5G systems. mmWave frequencies, however, have limited building penetration as compared to lower frequency waves. Due to this limited building penetration, cell sites containing the system antennas will need to be close to the network user to make up for the signal losses through buildings. This requires a greater cell density in the advanced wireless systems, relative to current systems. Additionally, to satisfy the improved utilization capacity requirements of advanced wireless systems, a greatly increased number of antennas, relative to current systems (e.g., Fourth Generation (4G) systems), will need to be deployed to support high bandwidth connections to each wireless device. In current wireless systems, the typical distance between adjacent antennas is about 1.5-3.2 kilometers (km). In contrast, for proposed advanced wireless systems, such as 5G systems, the distance between adjacent antennas may need to be reduced to about 200-300 meters. Therefore, next generation wireless systems may need as many as one hundred times the number of antennas as compared to current wireless systems.

Multiple-input and multiple-output (MIMO) is a technique for using multiple transmit and receive antennas to multiply the capacity of a radio link and exploit multipath propagation. MIMO is a component of wireless communication standards such as Wi-Fi (IEEE 802.11n & IEEE 802.11ac), WiMAX (4G) and Long-Term Evolution (4G). Full dimension MIMO (FD-MIMO) involves multiple transmit and receive antennas that can form beams in both horizontal and vertical directions such that the beams can cover anywhere in three-dimensional space in the vicinity of the multiple antennas. Massive MIMO involves a MIMO system that utilizes a very large number of antennas. The more antennas a massive MIMO system has, the more possible signal paths the system has and the better the system's performance in terms of data rate and link reliability.

BRIEF DESCRIPTION OF THE DRAWINGS

FIGS. 8A and 8B are flow diagrams that illustrate an exemplary process for optimizing wireless network coverage, capacity, and throughput based on network service Key Performance Indicators;

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Fifth Generation (5G) radio deployments at mmWave frequencies require more line of sight antenna installations as compared to current Fourth Generation (4G) radio deployments. Additionally, 5G cell deployments will be much denser than current 4G cell deployments, and mmWave 5G antennas will be much smaller and more directional than 3G or 4G antennas. Furthermore, 5G antennas are expected to be deployed on poles, lamp posts, bus stops, and other more open locations, that are more susceptible to environmental and human impacts that may negatively affect the deployment environment of the antennas. For example, in 5G radio deployments, deviation of antennas from their optimal deployment angles can have a detrimental effect on quality of service. To maintain good wireless network performance, given the characteristics of 5G radio deployments, a more proactive approach that includes a high level of performance monitoring will be required.

Exemplary embodiments described herein implement a central node, employing dynamic intelligent processes, that performs on-going monitoring of different wireless network key performance indicators, and which executes the dynamic processes for optimizing wireless network coverage, capacity, and throughput based on the monitored key performance indicators. Optimization of the wireless network coverage and capacity involves the continuous, or periodic, monitoring of the network key performance indicators, and the dynamical alteration of the number, and location, of antenna arrays of the cell sites within a geographic area based on the monitored key performance indicators. Optimization of wireless network throughput may involve adjusting the handover threshold between cell sites (in addition to many other factors), in a dynamic fashion, based on the monitored key performance indicators.

Figure 1:
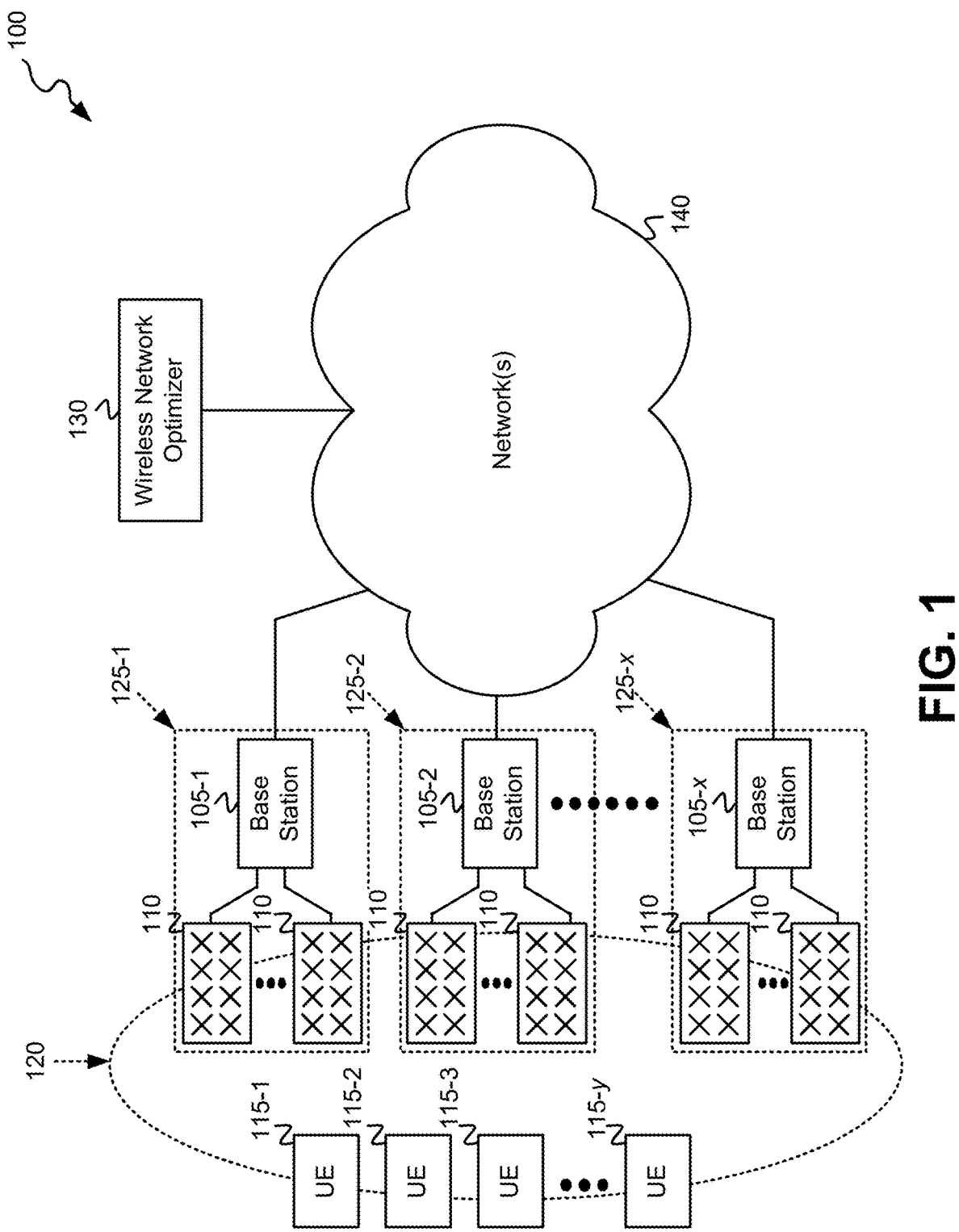
FIG. 1 illustrates an overview of an exemplary network environment in which wireless network coverage, capacity, and throughput is optimized by a centralized node that monitors various wireless network performance parameters.

FIG. 1 illustrates an overview of an exemplary network environment 100 in which wireless network coverage, capacity, and throughput is optimized by a central node that monitors various wireless network performance parameters. As shown, network environment 100 includes multiple base stations 105-1 through 105-$x$, multiple antenna arrays 110, multiple user equipment devices (UEs) 115-1 through 115-$y$, a wireless network optimizer 130, and one or more networks 140.

Base stations 105-1 through 105-$x$ (referred to herein as "base station 105" or "base stations 105") may each include a base station of a Public Land Mobile Network (PLMN), or other type of wireless station, that connects to one or more antenna arrays 110 and controls the transmission and reception of data via a wireless interface. Each of base stations 105 may include, for example, a Node B, an Evolved Node B (eNB), or a Next Generation Node B (gNB) of a PLMN (e.g., Third Generation (3G), Fourth Generation (4G), or Fifth Generation (5G) PLMN) that further includes the hardware that communicates between other nodes of the PLMN and mobile devices (i.e., UEs) that are located within the antenna beam patterns formed by respective antenna arrays 110.

Each base station 105 may, in some implementations, be split into various components and located in a distributed fashion. For example, base station 105 may be split into a base band unit (BBU) and multiple remote radio heads (RRHs), where the BBU may be located at a different location than the RRHs and may connect to the RRHs via, for example, optical fibers. Each BBU includes a network device that operates as the digital function unit that transmits digital baseband signals to the multiple RRHs, and receives digital baseband signals from the multiple RRHs. If the BBU is connected to the multiple RRHs via, for example, optical fibers, then the BBU may convert the digital baseband signals into corresponding optical signals for transmission to the RRHs, and may receive optical signals from the RRHs and convert the optical signals into corresponding digital baseband signals. The RRHs include network devices that operate as radio function units that transmit and receive radio frequency (RF) signals to/from UEs (e.g., UE 115). If the RRHs are connected to the BBU via an optic fiber, the RRHs may convert received RF signals to optical signals, and transmit the optical signals to the BBU. Additionally, the RRHs may receive optical signals from the BBU via the optic fiber, convert the optical signals to RF signals for transmission via one or more antenna arrays of the RRHs. Each of the RRHs may include at least one antenna array, transceiver circuitry, and other hardware and software components for enabling the RRHs to receive data via wireless RF signals from UEs 115, and to transmit wireless RF signals to UEs 115. Therefore, a "base station," as referred to herein, may include a BBU interconnected with multiple RRHs.

Antenna arrays 110 (referred to herein as "antenna array 110" or "antenna arrays 110") may each include an array of antennas, such as, for example, a FD-MIMO or massive MIMO antenna array, that may form antenna beams in horizontal and/or vertical directions to enable each array of antennas to cover a three-dimensional space in the vicinity of each array 110. For example, each antenna array 110 may include a number of horizontal antennas and a number of vertical antennas arranged in a row(s) and column(s) configuration. As an example, an antenna array 110 may include a 2×4 array with the number of vertical antennas equaling the number of rows (e.g., 2) and the number of horizontal antennas equaling the number of columns (e.g., 4). Alternatively, each antenna array 110 may include an m×n (m rows by n columns), where m is a number of vertical antennas in the array 110 and n is a number of horizontal antennas in the array 110, m and n may be any positive integer greater than or equal to one, and m and n may or may not equal one another. The antenna arrays 110 shown in FIG. 1 may produce a wireless network coverage area 120 within which UEs 115 may transmit to, and receive from, antenna arrays 110 via wireless transmissions. The wireless network coverage area 120 may provide reliable wireless connections over a particular geographic area and have a certain maximum capacity and throughput.

A "cell site," as referred to herein, includes a base station 105, and the one or more antenna arrays 110 to which base station 105 connects and that are used by the base station 105 for transmitting data to UEs 115, and for receiving data from UEs 115. As shown in FIG. 1, base station 105-1 and connected antenna array(s) 110 represent cell site 125-1, base station 105-2 and connected antenna array(s) 110 represent cell site 125-2, and base station 105-$x$ and connected antenna array(s) 110 represent cell site 125-$x$. Each cell site 125 provides wireless network coverage in a particular geographic area based on the antenna beams of the antennas of each antenna array 110. Each antenna of the antenna arrays 110 may form a single beam of radio coverage. In some implementations, each antenna may use a series of antenna elements to form the single beam of radio coverage. As described above, in some implementations, each base station 105 may include multiple distributed components (e.g., a BBU and multiple RRHs).

UEs 115-1 through 115-$y$ (referred to herein as "UE 115" or "UEs 115") each includes any type of device having one or more wireless communication interfaces for communicating via antenna arrays 110, base stations 105, and network 140. The UEs 115 may each include, for example, a cellular radiotelephone; a smart phone; a personal digital assistant (PDA); a wearable computer; a Machine-to-Machine (M2M) device; an Internet of Things (IoT) device; a desktop, laptop, palmtop or tablet computer; or a media player. Each UE 115 may connect to network 140 via a wireless connection. A "user" (not shown in FIG. 1) may be associated with each UE 115, and may be an owner, operator, and/or a permanent or temporary user of the UE 115.

Wireless network optimizer 130 may include one or more network devices that performs intelligent processes for optimizing the coverage, capacity, and throughput of a wireless network(s), such as, for example, a PLMN of network(s) 140. Wireless network optimizer 130 may, for example, perform the processes described below with respect to FIGS. 8A-11B to optimize the coverage, capacity, and throughput of the wireless network.

Networks 140 may include one or more networks of various types, with at least one network including a wireless network, such as, for example, a PLMN or a satellite mobile network. The PLMN may include a Code Division Multiple Access (CDMA) 2000 PLMN, a Global System for Mobile Communications (GSM) PLMN, a Long Term Evolution (LTE) PLMN, and/or other types of PLMNs. In addition to at least one wireless network, network(s) 140 may further include a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, and/or a cable network (e.g., an optical cable network).

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1.

Figure 2A:
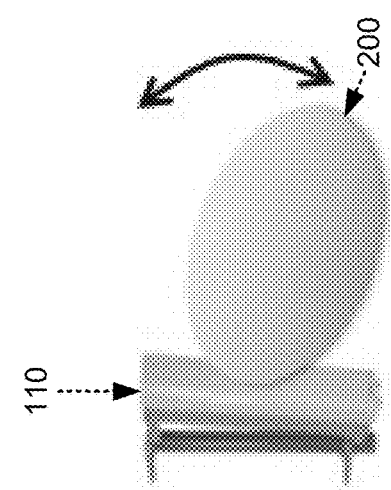
FIGS. 2A-2C depict examples of beam forming to create antenna beam patterns in three dimensions in the vicinity of an antenna array.
Figure 2B:
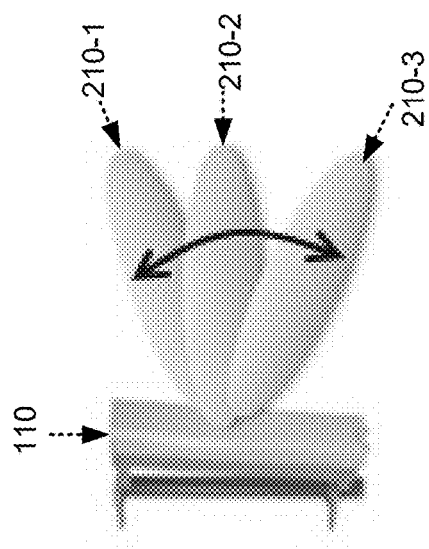
Figure 2C:
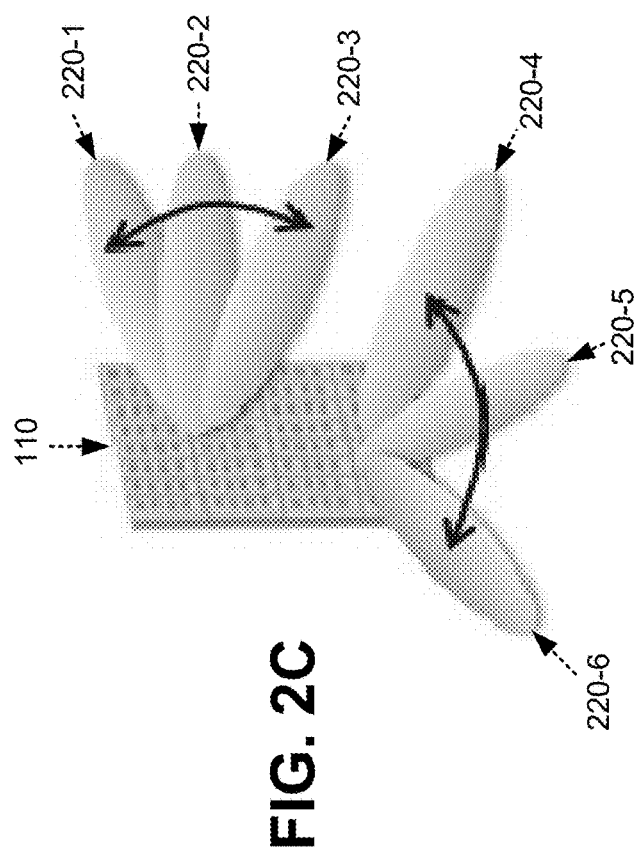

FIGS. 2A-2C depict examples of beam forming to create an antenna beam pattern in three dimensions in the vicinity of an antenna array 110. The example of FIG. 2A depicts a single antenna beam pattern 200 formed horizontally and vertically by a single antenna in an antenna array 110. Thus, as shown in FIG. 2A, an antenna, such as the antenna residing at the intersection of the third row and second column of the antenna array, may be configured to generate the antenna beam pattern 200 that extends downwards at a particular angle from the antenna.

The example of FIG. 2B depicts three antenna beam patterns 210-1, 210-2 and 210-3 formed horizontally and vertically by three different antennas in an antenna array 110. As shown in FIG. 2B, three antennas, residing adjacent one another in a single column of the antenna array 110, may be configured to generate a respective antenna beam pattern 210-1, 210-2, and 210-3 at a different angle (i.e., different elevation) relative to the position of each antenna's respective row within the antenna array 110.

The example of FIG. 2C further depicts six antenna beam patterns 220-1, 220-2, 210-3, 220-4, 220-5 and 220-6 formed horizontally and vertically by six different antennas in an antenna array 110. As shown in FIG. 2C, three antennas, residing adjacent one another in a single column of the antenna array 110, may be configured to generate a respective antenna beam pattern 220-2, 220-2, and 220-3 at a different angle (i.e., different elevation) relative to the position of each antenna's respective row within the antenna array 110. As further shown in FIG. 2C, three additional antennas, residing adjacent one another in a single row of the antenna array 110, may be configured to generate a respective antenna beam pattern 220-4, 220-5 and 220-6 at a different angle (i.e., different azimuth) relative to the position of each antenna's respective column within the antenna array 110.

Figure 3:
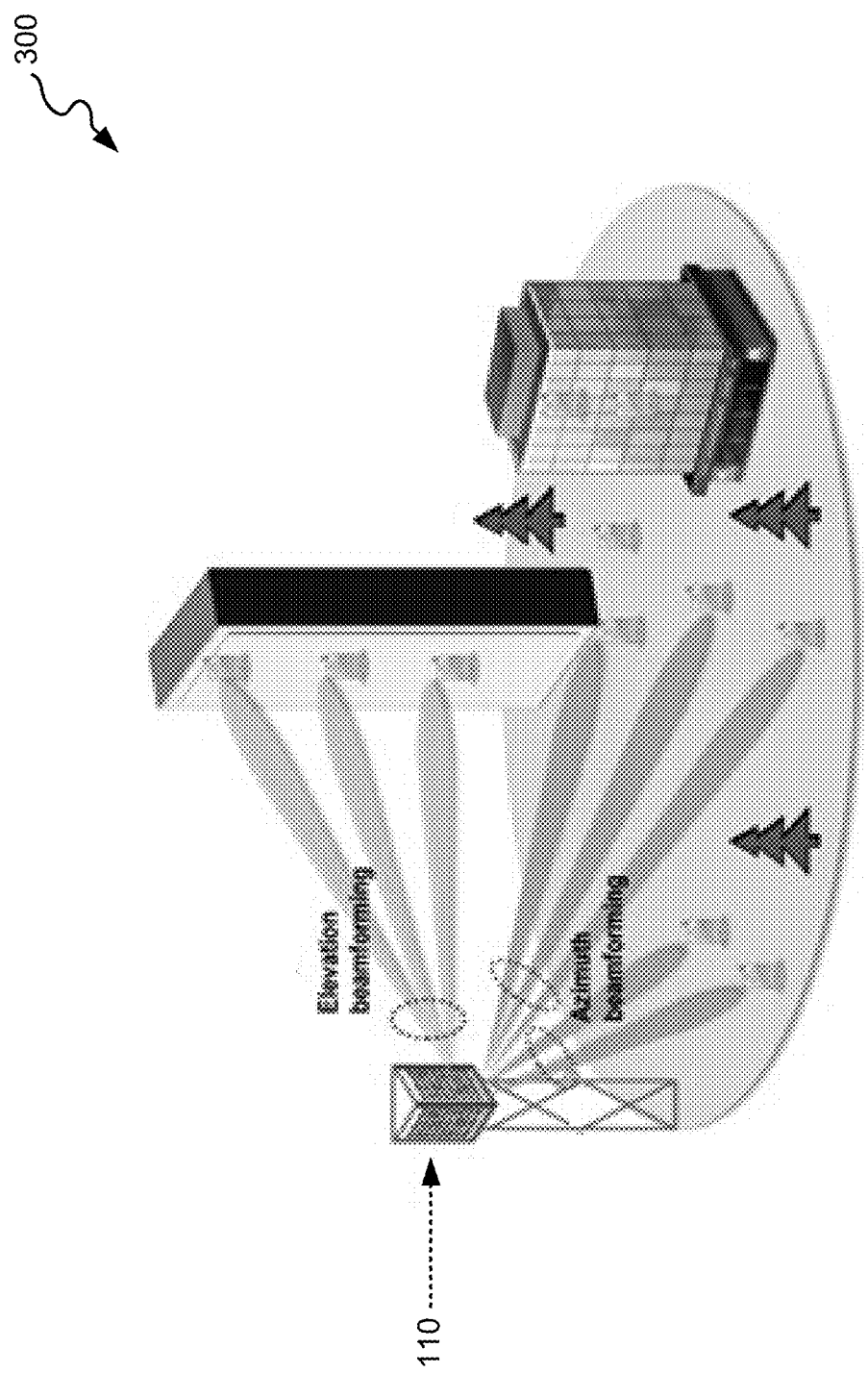
FIG. 3 depicts an example of a deployment of an antenna array in a three-dimensional physical environment.

FIG. 3 depicts an example of a deployment of an antenna array 110 in a three-dimensional physical environment 300. As shown in FIG. 3, the three-dimensional physical environment 300 includes various natural and man-made features (e.g., trees and buildings) among which various types of UEs 115 reside and wirelessly receive data via respective antenna beams of antenna array 110.

Figure 4:
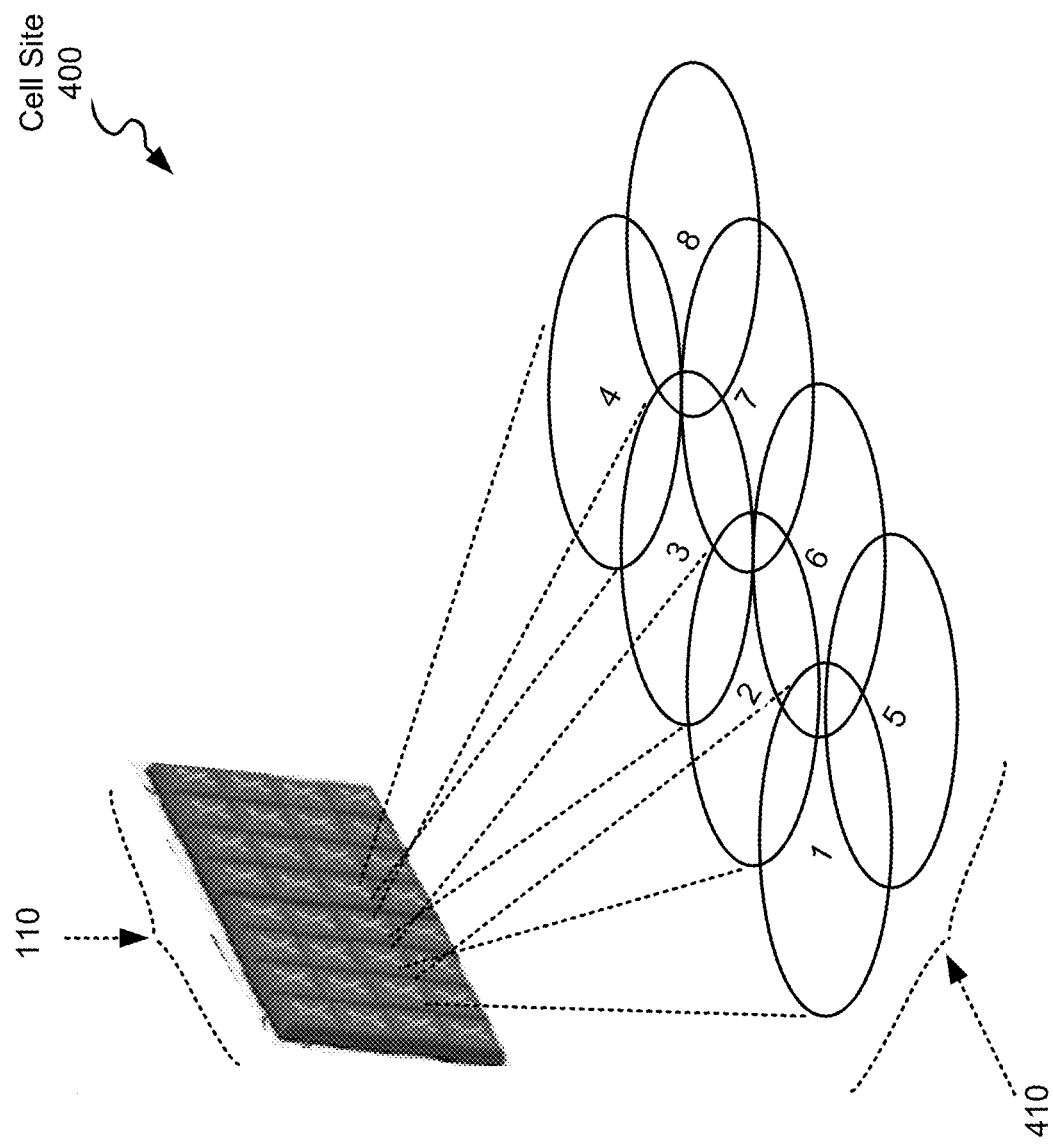
FIG. 4 depicts a simplified example of an antenna array associated with a cell site that provides at least a portion of the wireless network coverage shown in FIG. 1.

FIG. 4 depicts a simplified example of an antenna array 110 associated with a cell site 400 that provides at least a portion of the wireless network coverage 120 shown in FIG. 1. As shown, an antenna array 110, via respective antenna beams of the antennas of the array, generates a wireless network coverage area 410. The wireless network coverage area 410 may be composed of multiple cells that are produced by respective antenna beam patterns associated with each of the antennas of antenna array 110. FIG. 4 depicts a simplified example in which eight antenna beams generate respective overlapping cells (numbered 1 through 8) that produce the wireless network coverage area 410. Thus, a UE 115 (not shown) may transit between cells (e.g., between cell 1 and cell 6, or between cell 1 and cell 5), and the wireless network enables wireless network service to continue by "handing off" the UE 115 from one cell to the next.

Figure 5:
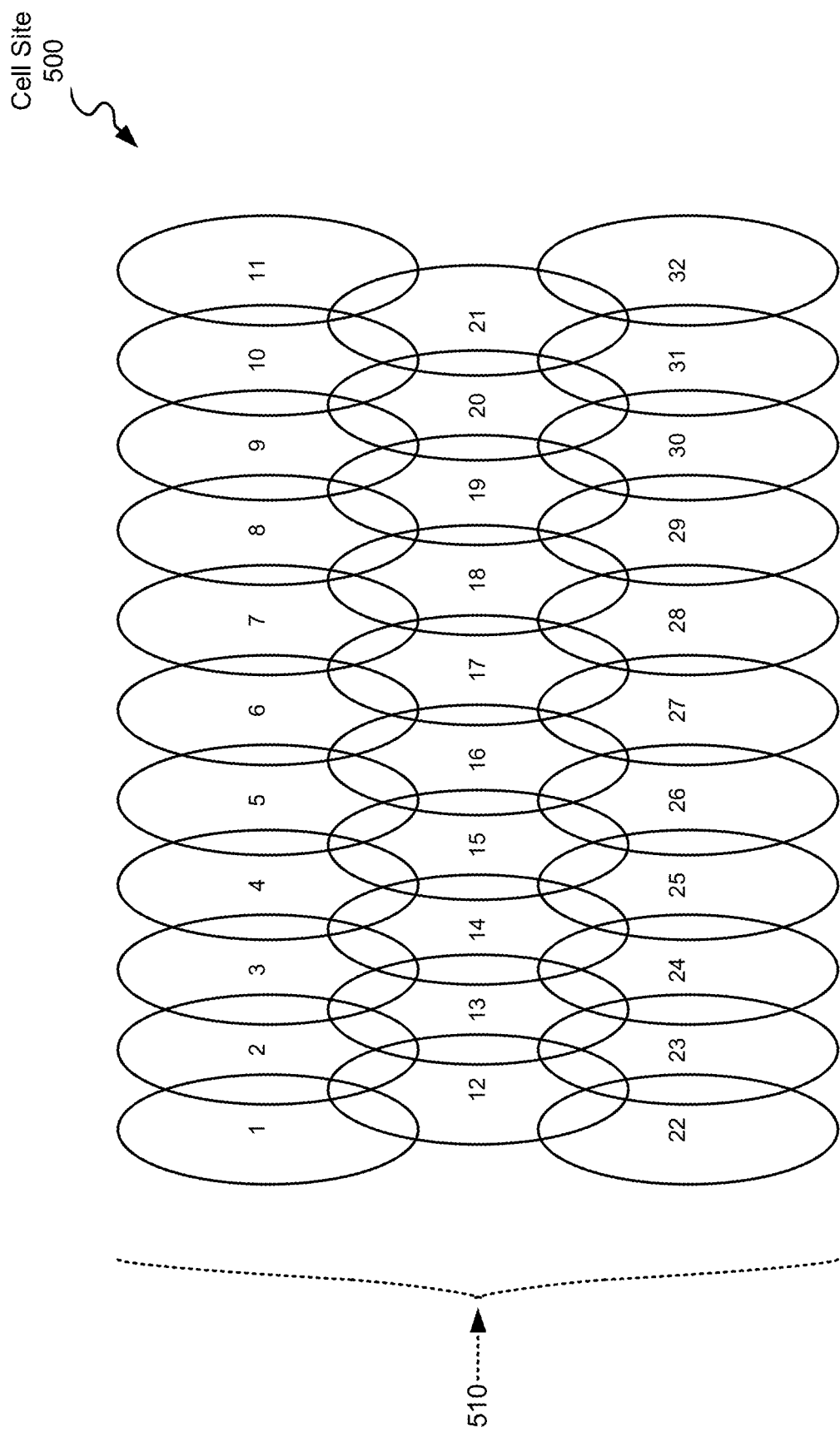
FIG. 5 depicts an overhead view of an example of a more complex cell site associated with providing at least a portion of the wireless network coverage shown in FIG. 1.

FIG. 5 depicts an overhead view of an example of a more complex cell site 500 associated with providing at least a portion of the wireless network coverage 120 shown in FIG. 1. The cell site 500 includes an antenna array 110 (not shown) that generates a beam map 510 associated with a wireless network coverage area composed of multiple cells that are produced by respective antenna beam patterns associated with each of the antennas of antenna array 110. In the example cell site 500 of FIG. 5, thirty-two antenna beams generate respective overlapping cells (numbered 1 through 32) that produce the wireless network coverage area of the beam map 510. Generally, a given cell site in a wireless network may produce a beam map 510 composed of n cells (where n is any positive integer greater than or equal to one) that are arranged in any pattern or configuration that ensures wireless service coverage in the particular area of the cell site.

Figure 6:
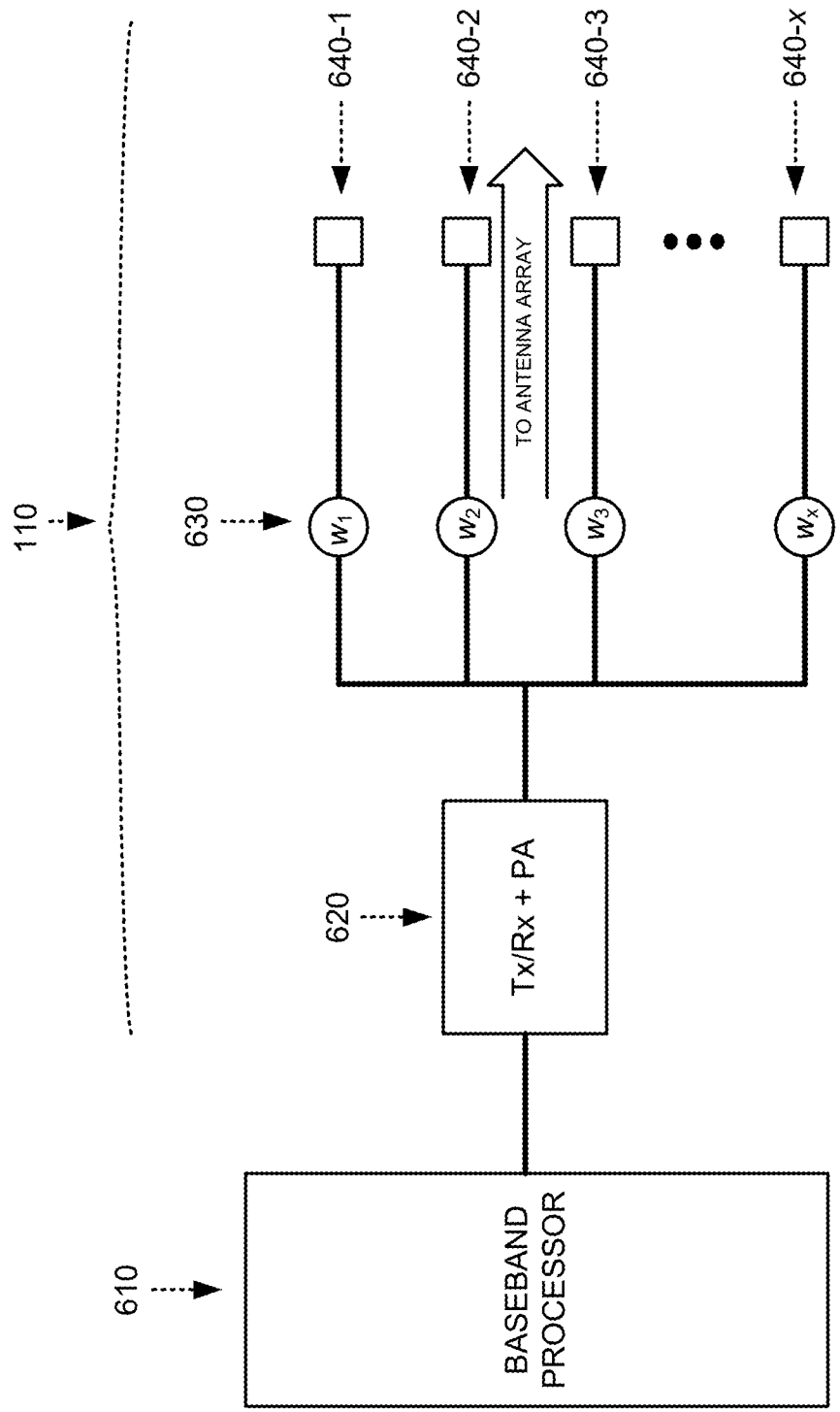
FIG. 6 depicts baseband processing components of a base station, and transmitter/receiver and power amplification components associated with an antenna array, according to an exemplary implementation.

FIG. 6 depicts baseband processing components of a base station 105, and transmitter/receiver and power amplification components associated with an antenna array 110, according to an exemplary implementation. In an implementation in which base station 105 is split into distributed components, such as a base band unit (BBU) and multiple remote radio heads (RRHs), baseband processor 610 may be a component of the BBU and the components of the antenna array 110 may further be components of a RRH. As shown, a baseband processor 610 of the base station 105 connects to components associated with an antenna array 110. The components of the antenna array 110 include a block transmitter/receiver and power amplifier (Tx/Rx+PA) 620, a weight vector 630, and multiple connectors 640-1 through 640-x for connecting to respective antennas 1 through x of an antenna array 110 (not shown) having x antennas.

Baseband processor 610 of base station 110 includes a device (e.g., a chip or part of a chip) in a network interface that manages radio functions that require the use of antenna array 110. Baseband processor 610 may include, in addition to other components, its own memory and software/firmware components. Tx/Rx+PA 620 may include a transmitter for transmitting via one or more antennas of the antenna array 110, a receiver for receiving via one or more antennas of the antenna array 110, and a power amplifier for amplifying signals transmitted, or received, via antennas of the antenna array 110. Weight vector unit 630 includes a device (s) for applying x weighted values to signals transmitted or received via the respective x antennas of the antenna array 110. Connectors 640-1 through 640-x each include a connector mechanism for electrically connecting a respective antenna of the antenna array 110 to a respective weight vector unit 630.

The configuration of the components of base station 105 and antenna array 110 depicted in FIG. 6 is for illustrative purposes only, and other configurations may be implemented. Therefore, base station 105 and/or antenna array 110 may include additional, fewer and/or different components, that may be configured differently, than depicted in FIG. 6. Though components for only a single antenna array 110 are shown in FIG. 6, baseband processor 610 may connect to multiple, different antenna arrays 110.

Figure 7:
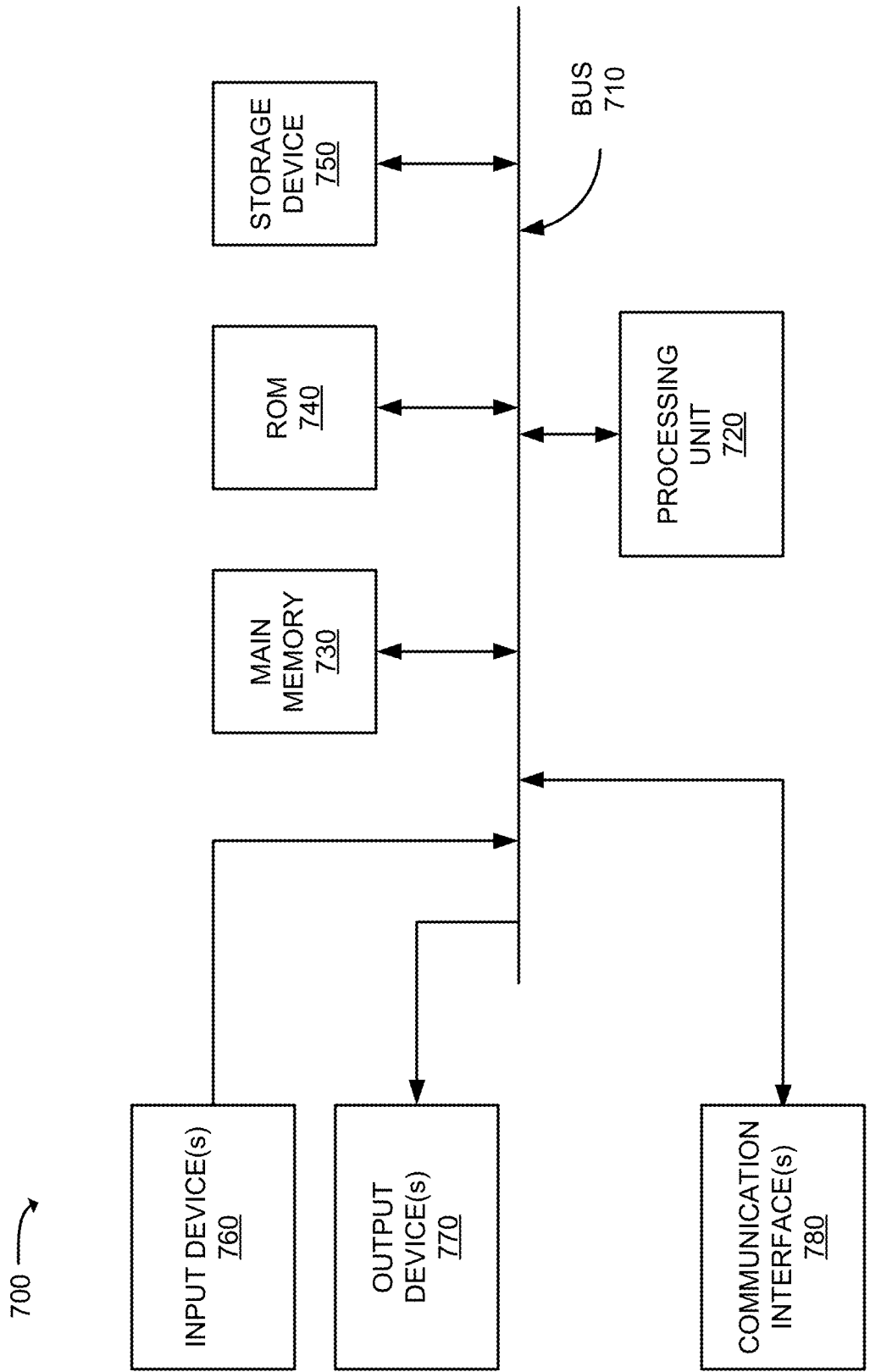
FIG. 7 is a diagram that depicts exemplary components of a device that may correspond to the UEs, base stations, and the wireless network optimizer of FIG. 1.

FIG. 7 is a diagram that depicts exemplary components of a device 700. UEs 115, base stations 105, and wireless network optimizer 130 may each include the same, or similar, components to those of device 700 shown in FIG. 7. Device 700 may include a bus 710, a processing unit 720, a main memory 730, a read only memory (ROM) 740, a storage device 750, an input device(s) 760, an output device(s) 770, and a communication interface(s) 780.

Bus 710 includes a path that permits communication among the components of device 700. Processing unit 720 may include one or more processors or microprocessors, or processing logic, which may interpret and execute instructions. Main memory 730 may include a random access memory (RAM) or another type of dynamic storage device that may store information and instructions for execution by processing unit 720. ROM 740 may include a ROM device or another type of static storage device that stores static information and instructions for use by processing unit 720. Storage device 750 may include a magnetic and/or optical recording medium. Main memory 730, ROM 740 and storage device 750 may each be referred to herein as a "non-transitory computer-readable medium" or a "non-transitory storage medium."

Input device(s) 760 may include one or more mechanisms that permit a user to input information to device 700, such as, for example, a keypad or a keyboard, a display with a touch sensitive panel, voice recognition and/or biometric mechanisms, etc. Output device(s) 770 may include one or more mechanisms that output information to the user, including a display (e.g., with a touch sensitive panel), a speaker, etc. Input device(s) 760 and output device(s) 770 may be implemented as a graphical user interface (GUI) (e.g., a touch screen GUI that uses any type of touch screen device) that displays GUI information and which receives user input via the GUI. Communication interface(s) 780 may include a transceiver that enables device 700 to communicate with other devices and/or systems. For example, communication interface(s) 780 may include wired and/or wireless transceivers for communicating via network 130.

The configuration of components of device 700 shown in FIG. 7 is for illustrative purposes. Other configurations may be implemented. Therefore, device 700 may include additional, fewer and/or different components, arranged in a different configuration, than depicted in FIG. 7.

Figure 8B:
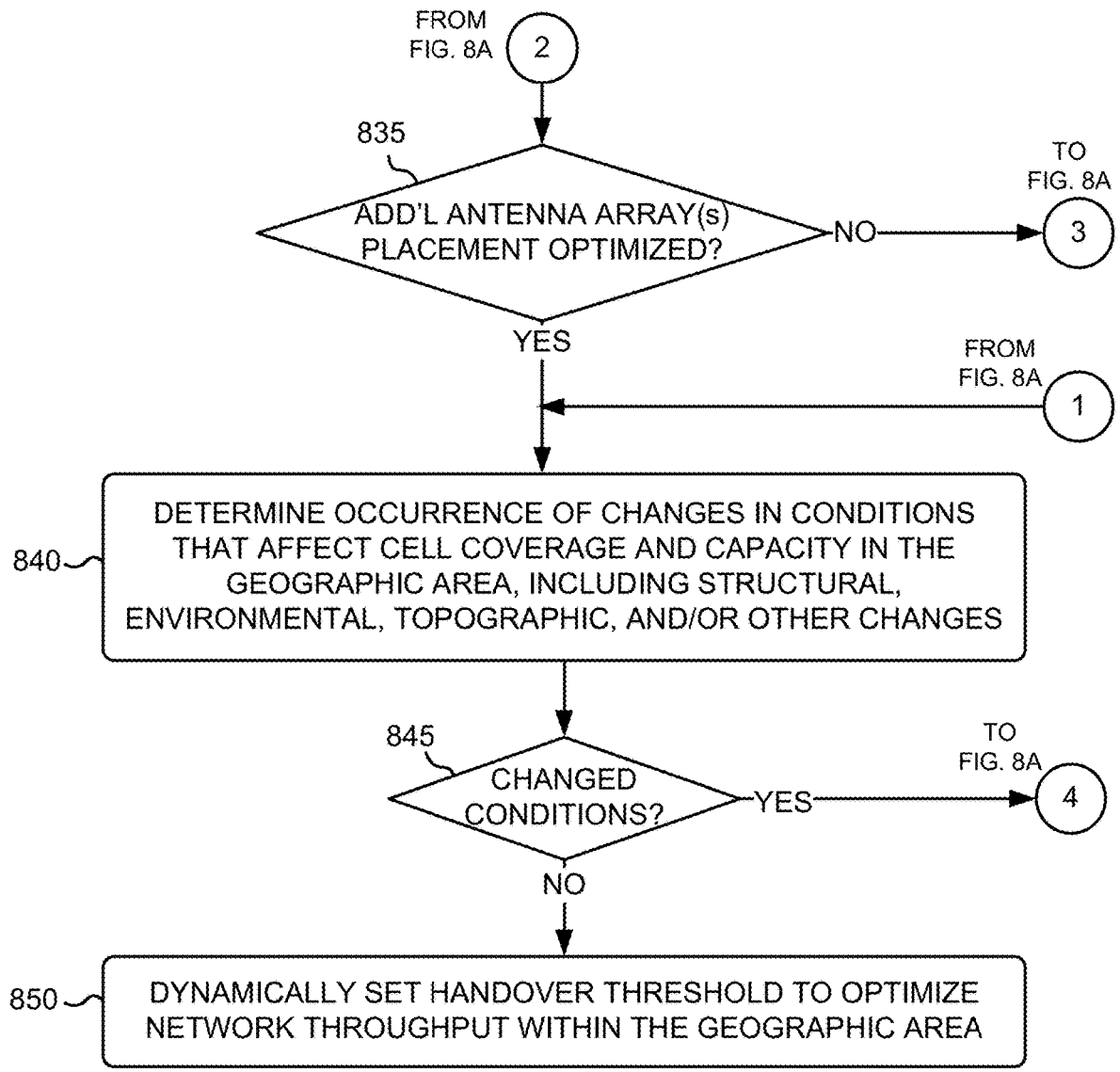

FIGS. 8A and 8B are flow diagrams that illustrate an exemplary process for optimizing wireless network coverage, capacity, and throughput based on network service Key Performance Indicators (KPIs). The exemplary process of FIGS. 8A and 8B may be implemented by wireless network optimizer 130, in conjunction with one or more antenna arrays 110. The exemplary process of FIGS. 8A and 8B may be repeated for each cell site 125 within a wireless network. Wireless network optimizer 130 may, thus, be concurrently executing a different instance of the process of FIGS. 8A and 8B for each cell site 125 within the wireless network (e.g., within a PLMN).

The exemplary process includes wireless network optimizer 130 receiving a first set of cell service Key Performance Indicators (KPIs) from a serving base station 105 of a cell site (block 800). The KPIs measured/determined by the serving base station 105 of the cell site may include, for example, the average active time per beam (ATavg), the receive signal strength per beam (Reference Signal Received Power (RSRP$_{rev}$), the receive Signal-to-Noise-Plus-Interference Ratio (SINR$_{rev}$) per beam, the Radio Resource Control (RRC) setup time (RRC$_{st}$), and RRC setup failure rate (RRC$_{sfr}$). Other KPIs, measured or determined by the serving base station 105, may additionally, or alternatively, be sent to the wireless network optimizer 130. The average active time per beam (ATavg) includes an average of active transmission time per beam (i.e., per antenna of the antenna array 110). The receive signal strength per beam (RSRP$_{rev}$) includes the RSRP of signals received via each beam (i.e., via each antenna of the antenna array 110). The Signal-to-Noise-Plus-Interference Ratio (SINR$_{rev}$) per beam includes the measured SINR of signals received via each beam (i.e., via each antenna of the antenna array 110). The Radio Resource Control (RRC) setup time (RRC$_{st}$) includes a determined time for setting up connections between UEs 115 and the antenna arrays 110 of the serving base station 105. The RRC setup failure rate (RRC$_{sfr}$) includes a determined rate associated with failures to set up connections between UEs 115 and the antenna arrays 110 of the serving base station 105.

Wireless network optimizer 130 receives a second set of cell service KPIs from UEs 115 via the base station 105 of the cell site (block 805). Each UE 115 measures/determines a receive signal strength of neighboring cell sites (RSRP$_{nc}$), and a SINR of neighboring cell sites (SINR$_{nc}$), and reports those measurements to the serving base station 105 which, in turn, forwards those measurements to wireless network optimizer 130.

Wireless network optimizer 130 determines a current cell capacity usage ("Cell Capacity") for the cell site (block 810) using, for example, Equation (1):

$$\text{Cell Capacity} = \int_{b=0}^{B}\int_{t=0}^{T}\int_{u=0}^{U} f(t, ATavg, \text{Modulation}(SINRu)) \quad \text{Eqn. (1)}$$

where t=time,
T=a current time interval,
ATavg=average active time per beam of the cell site's antenna array during the current time interval T,
u=user equipment (UE),
Modulation (SINRu)=modulation scheme employed by a UE u having a certain Signal-to-Noise-Plus-Interference Ratio (SINR$_u$),
b=a beam of the cell site's antenna array,
B=maximum number of beams of the cell site's antenna array, and
U=a number of UEs being served by the cell site during the current time interval T.

The current cell capacity usage of Eqn. (1) may be used to determine the current amount of usage, over the time interval T, by UUEs 115 receiving wireless service via B beams of the antenna array(s) 110 of the serving base station 105.

Wireless network optimizer 130 may determine a need for an additional antenna array(s) to provide adequate coverage and capacity for the geographic area served by the cell site based on the determined current cell capacity usage and the first and/or the second set of cell service KPIs (block 815). Wireless network optimizer 130 analyzes the current cell capacity usage (Eqn. (1)) for the cell site, and the first and/or second set of cell service KPIs, to determine the need to add one or more additional antenna arrays 110 for improving the coverage and capacity in the geographic area. Details of one exemplary implementation of block 815 is described further below with respect to the process of FIG. 9.

If an additional antenna array(s) 110 is determined in block 815 to not be needed (NO—block 820), then the exemplary process continues at block 840 below (FIG. 8B). If an additional antenna array(s) 110 is determined in block 815 to be needed (YES—block 820), then wireless network optimizer 130 determines an optimum location(s) within the geographic area of the cell site 125 for adding the additional antenna array(s) (block 825). Determination of an optimum location(s) for placement of an additional antenna array(s) may be based on a number of different factors, including UE distribution (e.g., per beam and/or in space and time) within the geographic area served by the cell site, beam data capacity usage per beam of the current antenna array(s) of the cell site, and a beam map of the cell site. Details of one exemplary implementation of block 825 is described further below with respect to the process of FIG. 10.

Wireless network optimizer 130 verifies optimization of placement of the additional antenna array(s) in the geographic area (block 830). To verify optimization of the placement of the additional antenna array(s), wireless network optimizer 135 may repeat the process of FIG. 10, described below, with optimization of placement of the additional antenna array(s) being verified if the identified location, in block 1020, is within close proximity to the location at which the antenna array(s) was previously added.

If placement of the additional antenna array(s) is not optimized (NO—block 835), then the exemplary process repeats at block 825, with wireless network optimizer 130 determining a different optimum location within the geographic area for adding the additional antenna array(s). The different optimum location within the geographic area may be determined by repeating the process of FIG. 10, described below, to identify a new location for placement of the additional antenna array(s).

If placement of the additional antenna array(s) is optimized (YES—block 835), then wireless network optimizer 130 determines whether there has been an occurrence of changes in conditions that affect cell coverage and/or capacity in the geographic area served by the cell site, including structural, environmental, topographic, and/or other changes (block 840). Structural changes may include, for example, the addition or removal of physical structures (buildings, walls, highway ramps or other roadway structures), and changes in existing structures (e.g., change in foundation of building affecting angle of reflection from building surfaces). In one implementation, one or more cameras may obtain images of an existing structure, and image analysis may be performed by wireless network optimizer 130 to determine the type of change(s) in the existing structure, and to model the effect(s) of the type of change(s). Environmental changes may include, for example, changes in the natural environment (e.g., trees have died, or been cut down) that affect signal transmission within a certain area. Topographic changes may include, for example, large scale changes to the topography that may affect signal transmission (e.g., new roadway berms, or other topographical changes to accommodate a roadway). Other changes may include, for example, damage to a cell site (e.g., to a BBU or RRH of a base station), damage to an antenna array, movement of an antenna array, etc.

If there are changed conditions (YES—block 845), then the exemplary process returns to block 800 (FIG. 8A) to re-determine the need for further additional antenna arrays. If there are no changed conditions (NO—block 845), then wireless network optimizer 130 dynamically sets the handover threshold to optimize network throughput within the geographic area (block 850). Dynamically setting the handover threshold may include adjusting the threshold level at which handover occurs from a first cell of a first cell site to a second cell of a second cell site when a UE 115 roams within a geographic area. Dynamic setting of the handover threshold may be based on a number of factors, such as, for example, current beam data usage per beam of an antenna array(s) 110 of the current cell site; $RRC_{sf}$, $RRC_{st}$, and cell capacity usage of the current cell site; and $RSRP_{nc}$, $SINR_{nc}$ and beam data usage of neighboring cell sites. Details of one exemplary implementation of block 850 is described further below with respect to the process of FIGS. 11A and 11B.

The exemplary process of FIGS. 8A and 8B may be repeated continuously, or periodically (e.g., at intervals specified by the mobile network operator), by wireless network optimizer 130 for each cell site 125 to dynamically optimize wireless network service coverage, capacity, and throughput to capture changes in the environment, changes in UE distribution, changes in usage patterns, and/or changes in overall network KPIs due to the optimization process itself. The dynamic optimization of FIGS. 8A and 8B, therefore, adapts to new conditions affecting network service coverage, capacity, and throughput in the network.

Figure 9:
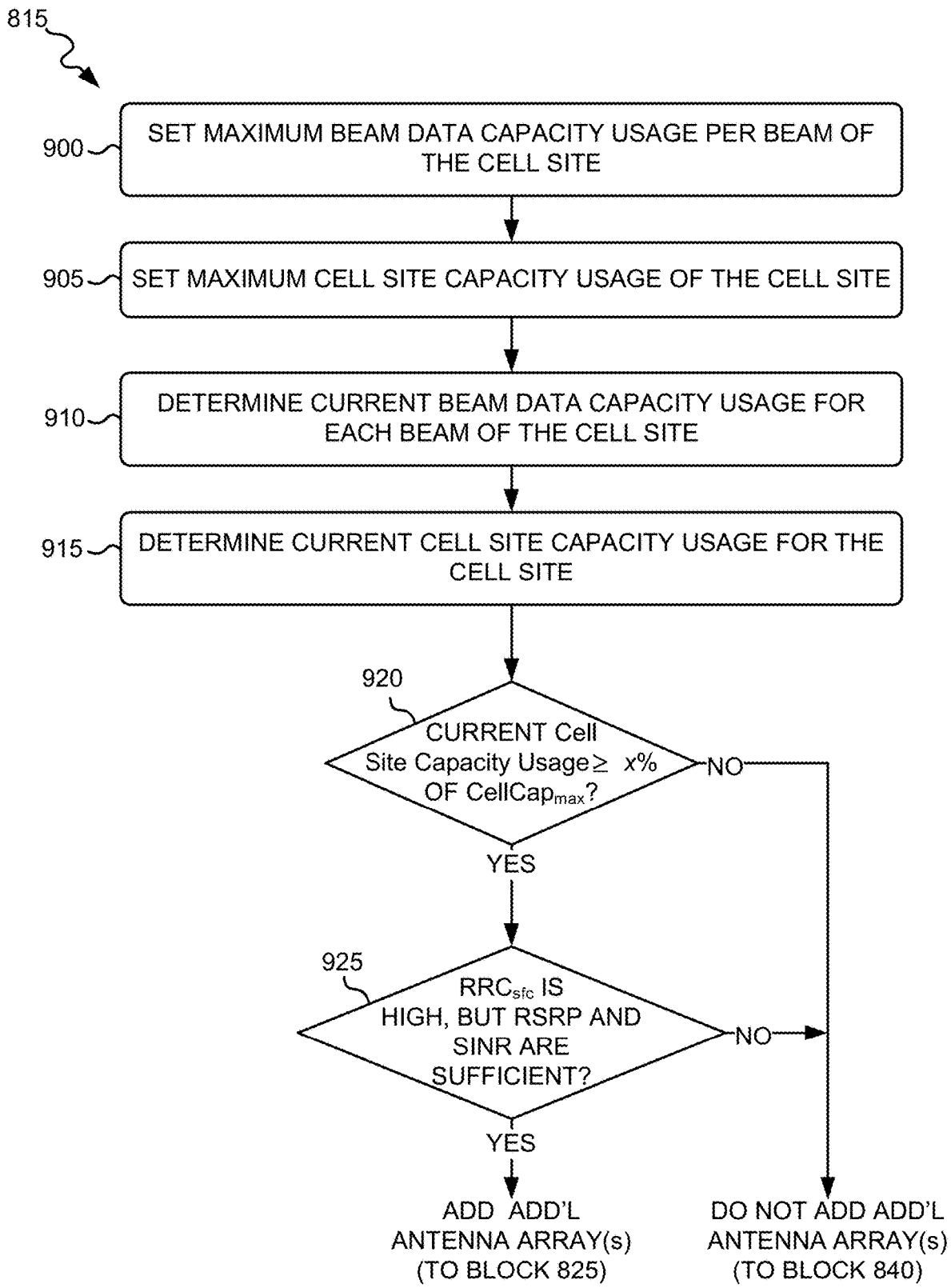
FIG. 9 is a flow diagram that illustrates an exemplary process for determining the need for an additional antenna array(s) in a geographic area to provide adequate wireless network coverage and capacity.

FIG. 9 is a flow diagram that illustrates an exemplary process for determining the need for an additional antenna array(s) in a geographic area to provide adequate wireless network coverage and capacity. The exemplary process of FIG. 9 represents one exemplary implementation of block 815 of the process of FIGS. 8A and 8B. The exemplary process of FIG. 9 may be implemented by wireless network optimizer 130.

The exemplary process includes wireless network optimizer 130 setting a maximum beam data capacity usage per beam of the cell site (block 900). The maximum beam data capacity usage per beam of the cell site equals the maximum data capacity that may be served by a given beam (i.e., antenna) of an antenna array 110 during a time interval T based on the fundamental performance constraints of the antenna and the base station 105. A current beam data capacity usage per beam ("beam data capacity") may be determined using Equation (2):

$$\text{Beam Data Capacity} = \int_{t=0}^{T}\int_{u=0}^{U} f(t, ATavg, \text{Modulation}(SINRu)) \qquad \text{Eqn. (2)}$$

where t=time,
T=a current time interval,
ATavg=average active time of the beam of antenna of antenna array 110 during the current time interval T,
u=a user equipment (UE),
Modulation (SINRu)=modulation scheme employed by a UE u having a certain Signal-to-Noise-Plus-Interference Ratio (SINR), and
U=number of UEs served by the beam of the antenna of the antenna array 110 during the current time interval T.

The determined current beam data capacity per beam of an antenna array 110, thus, may not exceed the maximum beam data capacity per beam.

Wireless network optimizer 130 sets a maximum cell capacity usage ($CellCap_{max}$) of the site (block 905). $CellCap_{max}$ for the antenna array(s) 110 of a cell site is the maximum cell capacity that is available for UE use over a time interval T and is based on a maximum number of beams (i.e., antennas) available for the antenna array(s) 110. A current cell capacity usage for each cell site may be determined using Eqn. (1) above, and the current cell capacity usage may not exceed $CellCap_{max}$.

Wireless network optimizer 130 determines a current beam data capacity usage for each beam of the cell site (block 910). Wireless network optimizer 130 may, for example, employ Eqn. (2) above to determine a current beam data capacity usage for each beam (i.e., for each active antenna of the antenna array(s) 110) of the cell site. Wireless network optimizer 130 uses knowledge of the UEs 115 that receive wireless service over a time interval T, and knowledge of parameters of the antenna array 110, including the average active time per beam, the modulation scheme used by each of the UEs 115, and the Signal-to-Noise-Plus-Interference Ratio ($SINR_u$) for each of the UEs 115.

Wireless network optimizer 130 determines a current cell capacity usage for the cell site (block 915). Wireless network optimizer 130 may, for example, employ Eqn. (1) above to determine a current cell site capacity usage for the cell site (i.e., for all of the antennas of the antenna array(s) 110 of the cell site). Wireless network optimizer 130 uses knowledge of the UEs 115 that receives wireless service over a time interval T, and knowledge of parameters of the antenna array 110, including a number of beams (i.e., the number of antennas) in the antenna arrays(s) 110 of the cell site, the average active time per beam, the modulation scheme used by each of the UEs 115, and the Signal-to-Noise-Plus-Interference Ratio ($SINR_u$) for each of the UEs 115.

Wireless network optimizer 130 determines if the current cell capacity usage is greater than or equal to x % of the maximum cell capacity of the cell site ($CellCap_{max}$) (block 920). If the current cell capacity usage is not greater than or equal to x % of the $CellCap_{max}$ (NO—block 920), then the process returns to block 910, and repeats blocks 910, 915, and 920. The value x may be preset or may be a dynamically varying value that varies based on network conditions. In one example, x % may be a fixed value of 80%. Other values of x, however, may be used.

If the current cell capacity usage is greater than or equal to x % of $CellCap_{max}$ (YES—block 920), then wireless network optimizer 130 determines if the RRC setup failure rate ($RRC_{sfr}$) received from the base station 105 is high, but the Reference Signal Received Power ($RSRP_{rcv}$) and Signal-to-Interference-plus-Noise Ratio ($SINR_{rcv}$) reported by the base station 105 are at a sufficient level (block 925). If $RRC_{sfr}$ is not high, or the $RSRP_{rcv}$ and $SINR_{rcv}$ are not at a sufficient level (NO—block 925), then the process continues at block 840 of FIG. 8B with an additional antenna array 110 not being added to the cell site. If $RRC_{sfr}$ is high, and the $RSRP_{rcv}$ and the $SINR_{rcv}$ are at a sufficient level (YES—block 925), then the process continues at block 825 of FIG. 8A with an additional antenna array(s) being added at the cell site.

Figure 10:
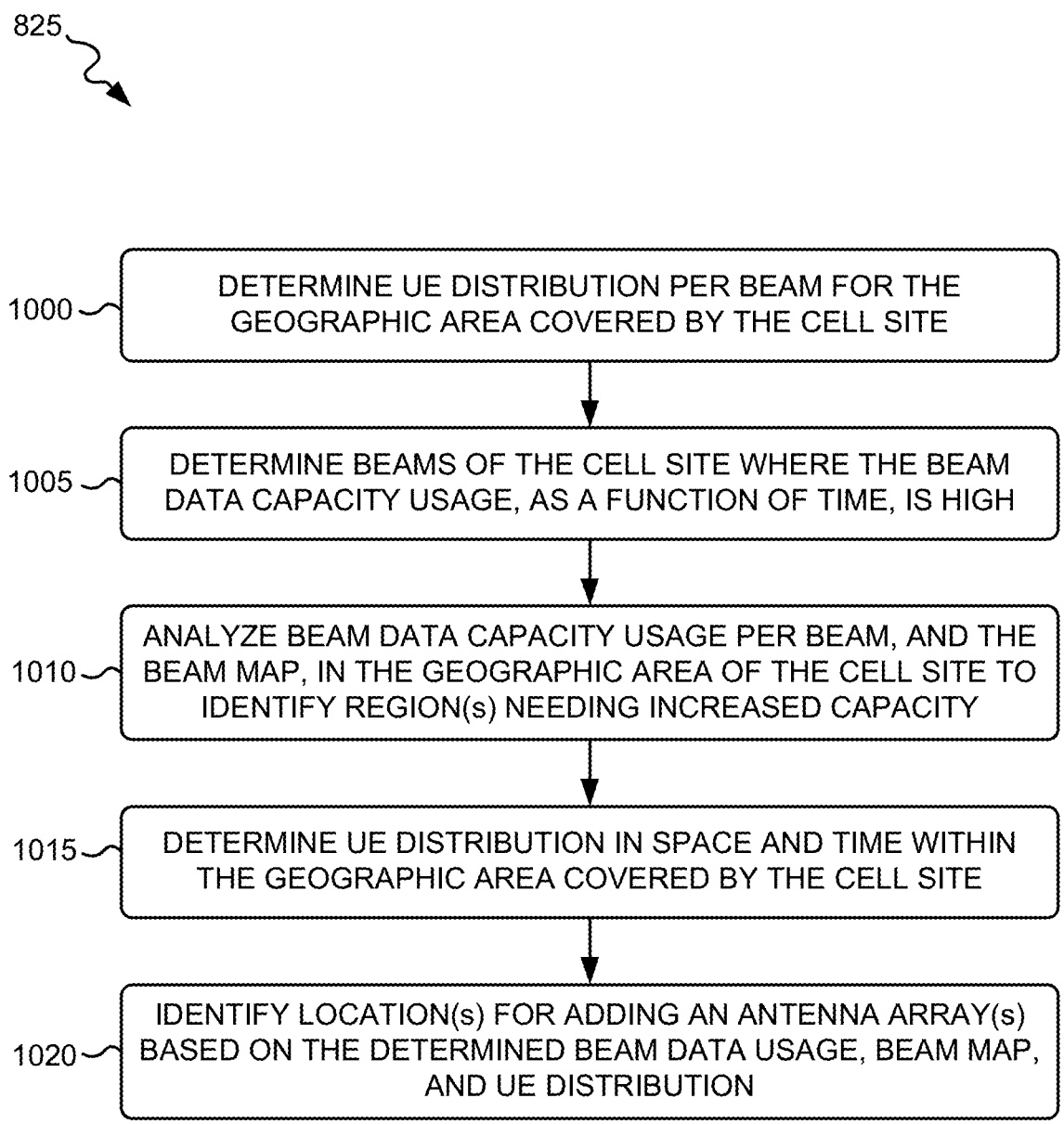
FIG. 10 is a flow diagram that illustrates an exemplary process for determining an optimum location(s) within a geographic area for adding an additional antenna array(s)

FIG. 10 is a flow diagram that illustrates an exemplary process for determining an optimum location(s) within a geographic area for adding an additional antenna array(s). The exemplary process of FIG. 10 represents one exemplary implementation of block 825 of the process of FIGS. 8A and 8B. The exemplary process of FIG. 10 may be implemented by wireless network optimizer 130.

The exemplary process includes wireless network optimizer 130 determining a UE 115 distribution per beam for the geographic area covered by the cell site (block 1000). Wireless network optimizer 130 determines, for each beam of the cell site (i.e., each antenna in the antenna array(s) 110 of the cell site), the UEs 115 that are using that beam over a particular time interval. For example, beam ID_1 may be determined to be serving five UEs 115, beam ID_2 may be determined to be serving ten UEs 115, beam ID_3 may be determined to be serving three UEs 115, and so on.

Wireless network optimizer 130 determines the beam(s) (i.e., antenna(s) of the antenna array(s) 110) of the cell site where the beam data capacity usage, as a function of time, is high (block 1005). Wireless network optimizer 130 may use Eqn. (2) to determine the current beam data capacity usage for each beam (i.e., each antenna) of the antenna array(s) 110 of the cell site and may compare the determined current beam data capacity usage for each beam with a threshold value to determine if the current beam data capacity usage exceeds the threshold value. In one implementation, the threshold value may include an average beam data capacity usage value for the cell site.

Wireless network optimizer 130 analyzes the beam data capacity usage per beam, and the beam map, in the geographic area of the cell site to identify region(s) needing increased capacity (block 1010). Wireless network optimizer 130 may compare the current beam data capacity usage for each beam, determined in block 1005, with a beam map that corresponds to the coverage area of the cell site, to determine areas of the beam map needing increased capacity. Referring to the example beam map 510 of the cell site 500 of FIG. 5, current beam data capacity usage for beams 1, 2, 3, 14, 15, 16, 27, and 28 of the beam map 510 may indicate high usage via those beams such that a high traffic area of active UEs 115 may be inferred within the geographic areas covered by those beams.

Wireless network optimizer 130 determines the distribution in space and time of UEs 115 within the geographic area covered by the cell site (block 1015). Wireless network optimizer 130 may generate a map that identifies UE IDs, and the location of those UEs, within the beam map of the cell site as a function of time. Therefore, a distribution of UEs 115 within the cell site may be determined at any given time based on the generated map.

Wireless network optimizer 130 identifies a location(s) for adding an antenna array(s) 110 based on the determined beam data capacity usage, the beam map, and the UE distribution (block 1020). The beam data capacity usage determined in block 1105, the beam map analyzed in block 1010, and the UE distribution determined in block 1015 may be used, among other factors, to identify a location(s) for adding an antenna array(s) 110 for connection to the base station 110 of the cell site. In some implementations, only a single location may be identified for locating a single antenna array 110. In other implementations, multiple locations may be identified at the cell site for locating multiple antenna arrays 110. In one implementation, the additional antenna array(s) 110 may be manually installed at the determined optimum location(s) within the geographic area served by the cell site 125 based on instructions received from wireless network optimizer 130.

Figure 11A:
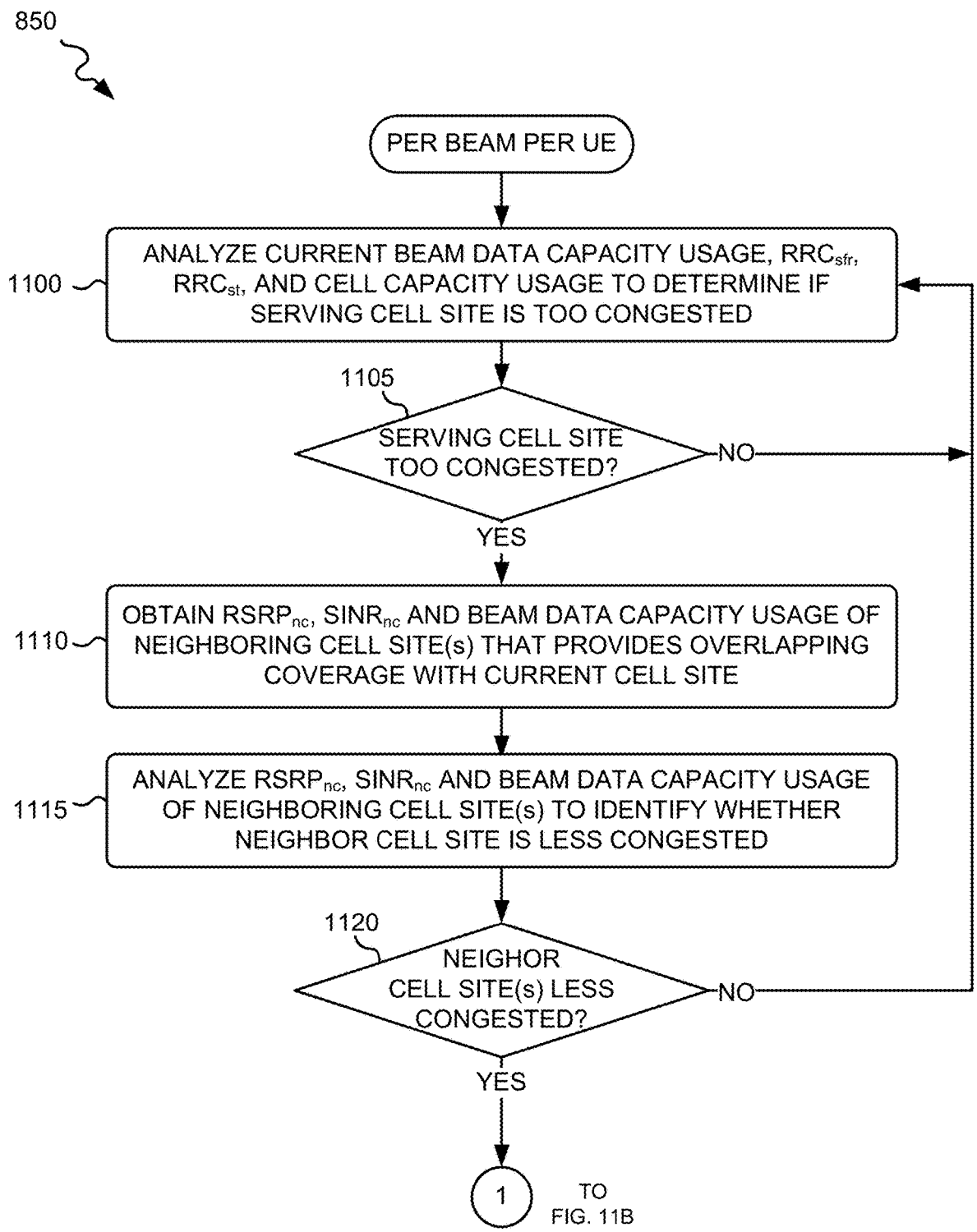
FIGS. 11A and 11B are flow diagrams that illustrate an exemplary process for dynamically setting a handover threshold to optimize network throughput within an area of a wireless network.
Figure 11B:
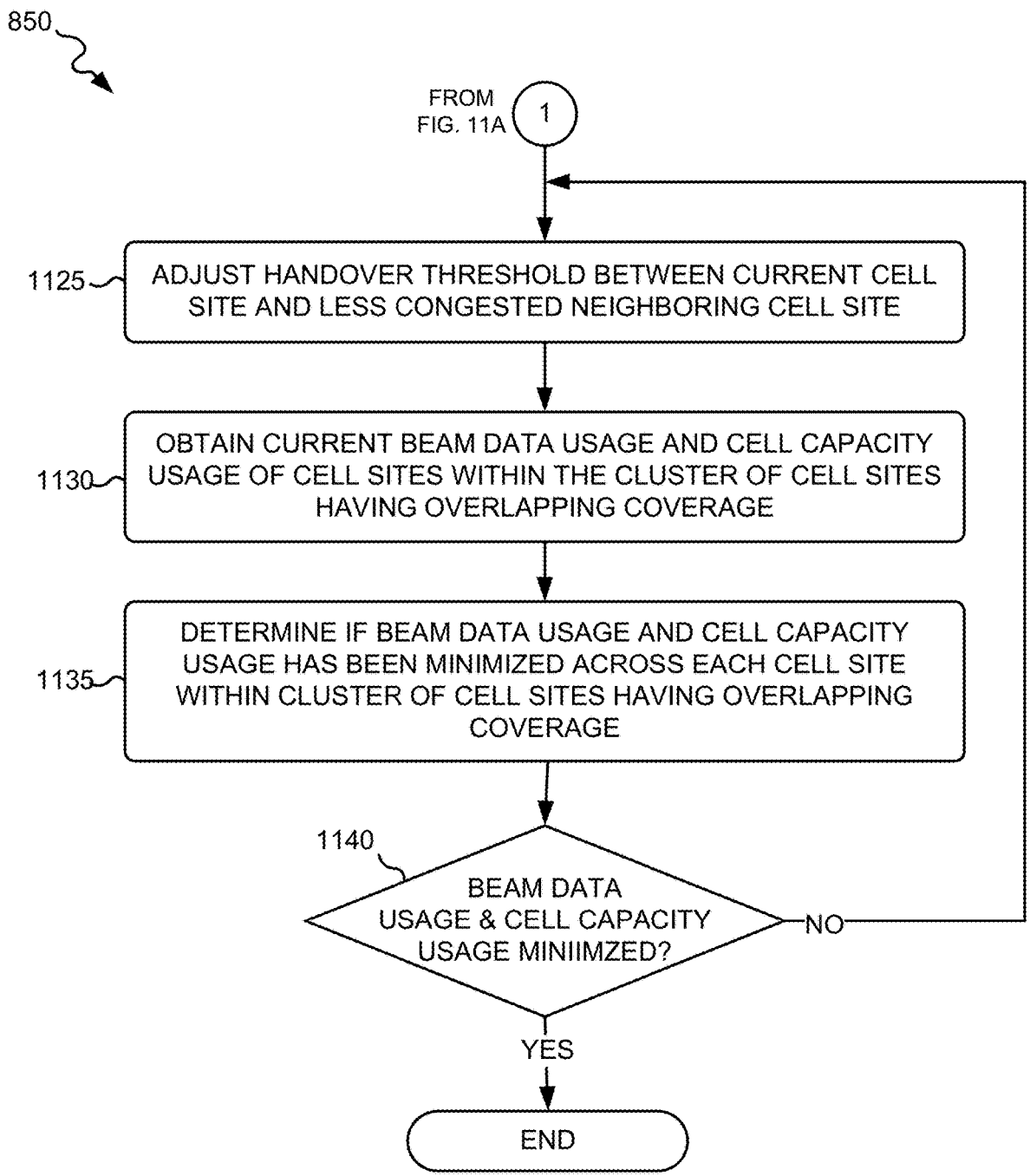

FIGS. 11A and 11B are flow diagrams that illustrate an exemplary process for dynamically setting a handover threshold to optimize network throughput within an area of a wireless network. The exemplary process of FIGS. 11A and 11B represents one exemplary implementation of block 850 of the process of FIGS. 8A and 8B. The exemplary process of FIGS. 11A and 11B may be implemented by wireless network optimizer 130.

The exemplary process includes wireless network optimizer 130 analyzing the current beam data capacity usage for each beam of the cell site, the $RRC_{sfr}$, $RRC_{st}$, and the cell site's cell capacity usage to determine if the serving cell site is too congested (block 1100). Threshold values may be established for the beam data capacity usage/beam, the $RRC_{sfr}$, the $RRC_{st}$, and the cell site cell capacity usage, and may be used for identifying whether currently measured/determined values indicate congestion within the serving cell site.

If the serving cell site is not too congested (NO—block 1105), then block 1100 may repeat. If the serving cell site is too congested (YES—block 1105), wireless network optimizer 130 obtains the $RSRP_{nc}$, $SINR_{nc}$, and beam data capacity usage of a neighboring cell site(s) that provides overlapping coverage with the current cell site (block 1110). A first cell site may have one or more antenna arrays 110 that generates a first beam map that has overlapping wireless coverage with a second beam map of one or more antenna arrays 110 of a second cell site.

Wireless network optimizer 130 analyzes the $RSRP_{nc}$, $SINR_{nc}$, and the beam data capacity usage of the neighboring cell site(s) to identify whether the neighbor cell site is less congested (block 1115). Threshold values may be established for the $RSRP_{nc}$, $SINR_{nc}$, and the beam data capacity usage of the neighboring cell site(s) and may be used for identifying a current level of congestion relative to the current cell site.

If the neighboring cell site(s) is not less congested (NO—block 1120), then the process returns to block 1100. If the neighboring cell site(s), having overlapping coverage with the current cell site, is at least as congested as the current cell site, then there is no need to adjust the handover threshold to increase handoffs for UEs 115 between the current serving cell site and a neighboring cell site. As used herein, "handoff" or "handover" refers to the process of transferring an ongoing wireless call or data session from a first beam of a first antenna to a second beam of a second antenna, where the first antenna and the second antenna may be part of a same antenna array 110 or a different antenna array 110. If the neighboring cell site(s) is less congested (YES—block 1120), then wireless network optimizer 130 adjusts the handover threshold between the current cell site and the less congested neighboring cell site (block 1125). The handover threshold (also referred to herein as "cell selection threshold") for determining whether to handoff a UE 115 from the current cell site to the less congested neighboring cell site may be adjusted to increase the likelihood of handoff. For example, if handover is based on the received signal level dropping below a certain threshold value, then the threshold value may be increased such that handover occurs at a higher received signal level. The adjusted handover threshold value may be sent from wireless network optimizer 130 to the current cell site for updating the handover threshold used for determining whether to handoff a UE 115 to the neighboring cell site. In some implementations, the serving cell site (e.g., serving base station 105) for a particular UE 115 may direct the UE 115 what handover threshold to currently use based on the adjusted handover threshold value received from wireless network optimizer 130.

Wireless network optimizer 130 obtains a current beam data capacity usage and cell capacity usage of cell sites within a cluster of cell sites having overlapping coverage with the current cell site (block 1130). For example, if beam maps of adjacent cell sites 1 and 2 indicate that there is overlapping coverage, then wireless network optimizer 130 may determine a current beam data capacity usage per beam, and a current cell capacity usage, of both of the cell sites.

Wireless network optimizer 130 determines if the beam data capacity usage and the cell capacity usage has been minimized across each cell site within the cluster of cell sites having the overlapping coverage (block 1135). Therefore, if cell site 1 has beams 1-10, and adjacent cell site 2 has beams 1-20, then wireless network optimizer 130 determines if the beam data capacity usage for each of beams 1-10 of cell site 1, and the beam data capacity usage for each of beams 1-20, has been minimized. Additionally, wireless network optimizer 130 determines if the cell capacity usage across cell site 1 (i.e., across beams 1-10), and the cell capacity usage across cell site 2 (i.e., across beams 1-20), has been minimized. Wireless network optimizer 130, therefore, dynamically adjusts the handover threshold to simultaneously minimize the beam data capacity usage and the cell capacity usage across the cell sites having overlapping coverage.

If the beam data usage and cell capacity usage are not minimized across the cell sites of the cluster of cell sites (NO—block 1140), then the process returns to block 1125 with wireless network optimizer 130 re-adjusting the handover threshold between the current cell site and the less congested neighboring cell site. Therefore, wireless network optimizer 130 may increase or decrease the handover threshold between the beams of a first cell site, and the beams of an overlapping cell site(s). If the beam data usage and cell capacity usage are minimized across the cell sites of the cluster of cell sites (YES—block 1140), then the handover threshold has been dynamically set to optimize network throughput in the geographic area of the current cell site, and execution of block 850 has completed.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8A, 8B, 9, 10, 11A, and 11B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a wireless network optimizing node, first key performance indicators (KPIs) from a cell site providing wireless service within a geographic area, wherein the first KPIs are associated with wireless communication between beams of an antenna array of the cell site and a plurality of user equipment devices (UEs);
determining, by the wireless network optimizing node, a current cell site capacity usage for the cell site based on current wireless network usage parameters received from the cell site;
determining, by the wireless network optimizing node, a need for an additional antenna array to provide adequate coverage and capacity for the geographic area based on the current cell site capacity usage and the first KPIs; and
determining, by the wireless network optimizing node, an optimum location within the geographic area for adding the additional antenna array.

2. The method of claim 1, further comprising:
verifying optimization of the additional antenna array in the geographic area; and
determining, if the additional antenna array is not optimized, another location within the geographic area for placement of the additional antenna array.

3. The method of claim 1, further comprising:
determining an occurrence of changes in conditions that affect cell coverage and capacity in the geographic area; and
performing, based on the occurrence of changes in the conditions, the following:
determining a second current cell site capacity usage for the cell site based on current wireless network usage parameters received from the cell site,
determining a need for a second antenna array to provide adequate coverage and capacity for the geographic area based on the second current cell site capacity usage and the first KPIs, and
determining a second optimum location within the geographic area for adding the second antenna array.

4. The method of claim 1, further comprising:
dynamically setting, by the wireless network optimizing node, a cell selection threshold to optimize network throughput within the geographic area of the cell site.

5. The method of claim 1, wherein the current cell site capacity usage is determined by the wireless network optimizing node using the following:

$$\text{Cell Capacity} = \int_{b=0}^{B}\int_{t=0}^{T}\int_{u=0}^{U} f(t, ATavg, \text{Modulation}(SINRu)),$$

where:
the Cell capacity is the current cell site capacity usage,
t=time,
ATavg=average active time per beam of the cell site's antenna array,
u=user equipment (UE),
Modulation (SINRu)=modulation scheme employed by a UE u having a certain Signal-to-Noise-Plus-Interference Ratio (SINR),
b=a beam of the cell site's antenna array,
B=maximum number of beams of the cell site's antenna array,
T=a time interval, and
U=a number of UEs being served by the cell site within the time interval T.

6. The method of claim 1, wherein determining the optimum location within the geographic area for adding the additional antenna array further comprises:
determining, by the wireless network optimizing node, a current beam data capacity usage for each beam of the cell site based on current wireless network usage parameters received from the cell site.

7. The method of claim 6, wherein the current beam data capacity usage for each beam of the cell site is determined, by the wireless network optimizing node, using the following:

$$\text{Beam Data Capacity} = \int_{t=0}^{T}\int_{u=0}^{U} f(t, ATavg, \text{Modulation}(SINRu)),$$

where:
the Beam Data Capacity is the current beam data capacity usage for each beam of the cell site,
t=time,
ATavg=average active time of the beam associated with an antenna of the cell site's antenna array,
u=a user equipment (UE),
Modulation (SINRu)=modulation scheme employed by a UE u having a certain Signal-to-Noise-Plus-Interference Ratio (SINR),
T=a time interval, and
U=number of UEs served by the beam associated with the antenna of the cell site's antenna array within the time interval T.

8. A network device, comprising:
a communication interface configured to:
receive first key performance indicators (KPIs) from a base station of a cell site providing wireless service within a geographic area, wherein the first KPIs are associated with wireless communication between beams of an antenna array of the cell site and a plurality of user equipment devices (UEs); and
a processing unit configured to:
determine a current cell site capacity usage for the cell site based on current wireless network usage parameters received from the cell site,
determine a need for an additional antenna array to provide adequate coverage and capacity for the geographic area based on the current cell site capacity usage and the first KPIs, and
determine an optimum location within the geographic area for adding the additional antenna array.

9. The network device of claim 8, wherein the processing unit is further configured to:
verify optimization of the additional antenna array in the geographic area; and
determine, if the additional antenna array is not optimized, another location within the geographic area for placement of the additional antenna array.

10. The network device of claim 8, wherein the processing unit is further configured to:
determine an occurrence of changes in conditions that affect cell coverage and capacity in the geographic area; and
perform, based on the occurrence of changes in the conditions, the following:

determine a second current cell site capacity usage for the cell site based on current wireless network usage parameters received from the cell site, determine a need for a second antenna array to provide adequate coverage and capacity for the geographic area based on the second current cell site capacity usage and the first KPIs, and determine a second optimum location within the geographic area for adding the second antenna array.

11. The network device of claim 8, wherein the processing unit is further configured to:

dynamically set a cell selection threshold to optimize network throughput within the geographic area of the cell site.

12. The network device of claim 8, wherein the current cell site capacity usage is determined using the following:

$$\text{Cell Capacity} = \int_{b=0}^{B}\int_{t=0}^{T}\int_{u=0}^{U} f(t, ATavg, \text{Modulation}(SINRu)),$$

where:
the Cell capacity is the current cell site capacity usage,
t=time,
ATavg=average active time per beam of the cell site's antenna array,
u=user equipment (UE),
Modulation (SINRu)=modulation scheme employed by a UE u having a certain Signal-to-Noise-Plus-Interference Ratio (SINR),
b=a beam of the cell site's antenna array,
B=maximum number of beams of the cell site's antenna array,
T=a time interval, and
U=a number of UEs being served by the cell site within the time interval T.

13. The network device of claim 8, wherein, when determining the optimum location within the geographic area for adding the additional antenna array, the processing unit is further configured to:

determine a current beam data capacity usage for each beam of the cell site based on current wireless network usage parameters received from the cell site.

14. The network device of claim 13, wherein the current beam data capacity usage for each beam of the cell site is determined using the following:

$$\text{Beam Data Capacity} = \int_{t=0}^{T}\int_{u=0}^{U} f(t, ATavg, \text{Modulation}(SINRu)),$$

where:
the Beam Data Capacity is the current beam data capacity usage for each beam of the cell site,
t=time,
ATavg=average active time of the beam associated with an antenna of the cell site's antenna array,
u=a user equipment (UE),
Modulation (SINRu)=modulation scheme employed by a UE u having a certain Signal-to-Noise-Plus-Interference Ratio (SINR),
T=a time interval, and
U=number of UEs served by the beam associated with the antenna of the cell site's antenna array within the time interval T.

15. A non-transitory storage medium storing instructions executable by a network device, wherein the instructions comprise instructions to cause the network device to:

receive first key performance indicators (KPIs) from a base station of a cell site providing wireless service within a geographic area, wherein the first KPIs are associated with wireless communication between beams of an antenna array of the cell site and a plurality of user equipment devices (UEs);

determine a current cell site capacity usage for the cell site based on current wireless network usage parameters received from the cell site;

determine a need for an additional antenna array to provide adequate coverage and capacity for the geographic area based on the current cell site capacity usage and the first KPIs; and determine an optimum location within the geographic area for adding the additional antenna array.

16. The non-transitory storage medium of claim 15, wherein the instruction further comprise instructions to cause the network device to:

verify optimization of the additional antenna array in the geographic area; and determine, if the additional antenna array is not optimized, another location within the geographic area for placement of the additional antenna array.

17. The non-transitory storage medium of claim 15, wherein the instructions further comprise instructions to cause the network device to:

determine an occurrence of changes in conditions that affect cell coverage and capacity in the geographic area; and perform, based on the occurrence of changes in the conditions, the following:

determine a second current cell site capacity usage for the cell site based on current wireless network usage parameters received from the cell site, determine a need for a second antenna array to provide adequate coverage and capacity for the geographic area based on the second current cell site capacity usage and the first KPIs, and determine a second optimum location within the geographic area for adding the second antenna array.

18. The non-transitory storage medium of claim 15, wherein the instructions further comprise instructions to cause the network device to:

dynamically set a cell selection threshold to optimize network throughput within the geographic area of the cell site.

19. The non-transitory storage medium of claim 15, wherein the current cell site capacity usage is determined using the following:

$$\text{Cell Capacity} = \int_{b=0}^{B}\int_{t=0}^{T}\int_{u=0}^{U} f(t, ATavg, \text{Modulation}(SINRu)),$$

where:
the Cell capacity is the current cell site capacity usage,
t=time,
ATavg=average active time per beam of the cell site's antenna array,
u=user equipment (UE),
Modulation (SINRu)=modulation scheme employed by a UE u having a certain Signal-to-Noise-Plus-Interference Ratio (SINR), b=a beam of the cell site's antenna array, B=maximum number of beams of the cell site's antenna array, T=a time interval, and U=a number of UEs being served by the cell site within the time interval T.

20. The non-transitory storage medium of claim 15, wherein determining the optimum location within the geographic area for adding the additional antenna array further comprises:

determining, by the wireless network optimizing node, a current beam data capacity usage for each beam of the cell site based on current wireless network usage parameters received from the cell site.

* * * * *